Dec. 22, 1964  W. L. PORTER ETAL  3,162,019
METHOD AND APPARATUS FOR FREEZING LIQUIDS TO BE
USED IN A FREEZE-DRYING PROCESS
Filed Nov. 16, 1962  2 Sheets-Sheet 2
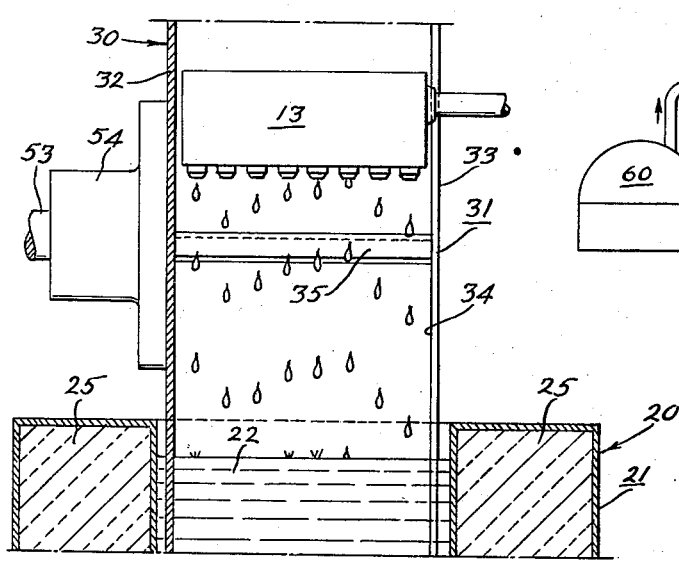
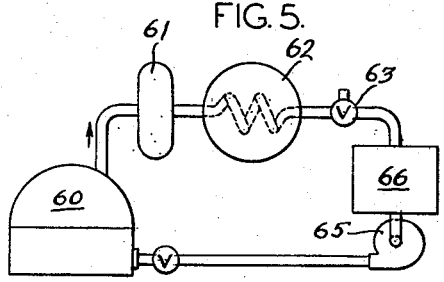
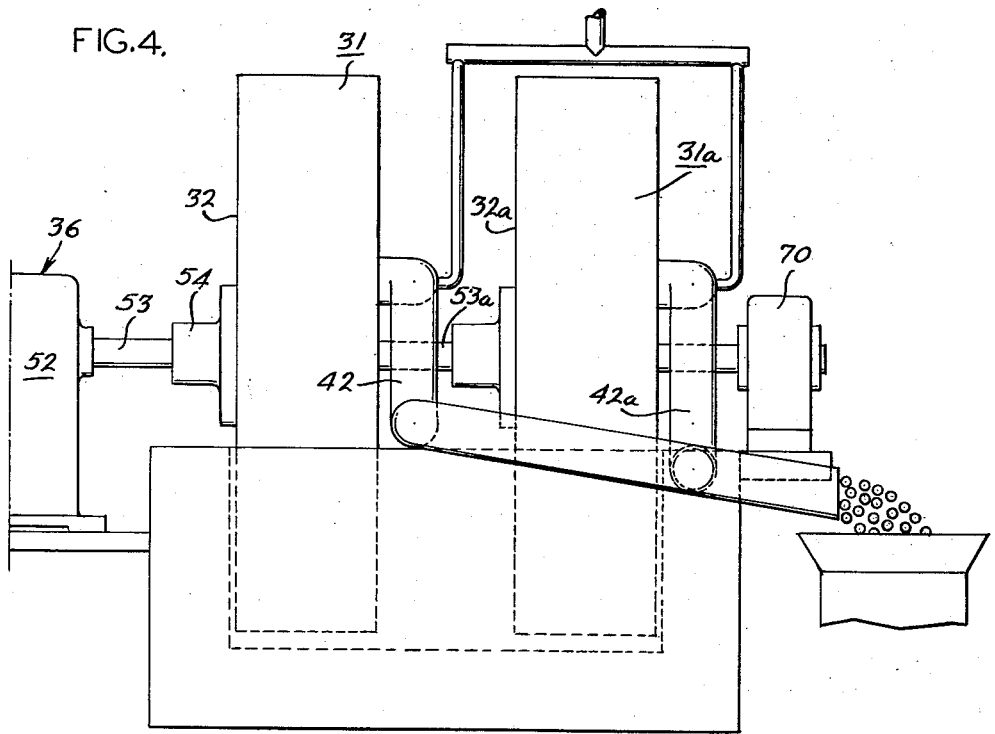
INVENTORS:
WILLIAM L. PORTER
WILLIAM L. ROOT 3rd
BY Howson & Howson
ATTYS.

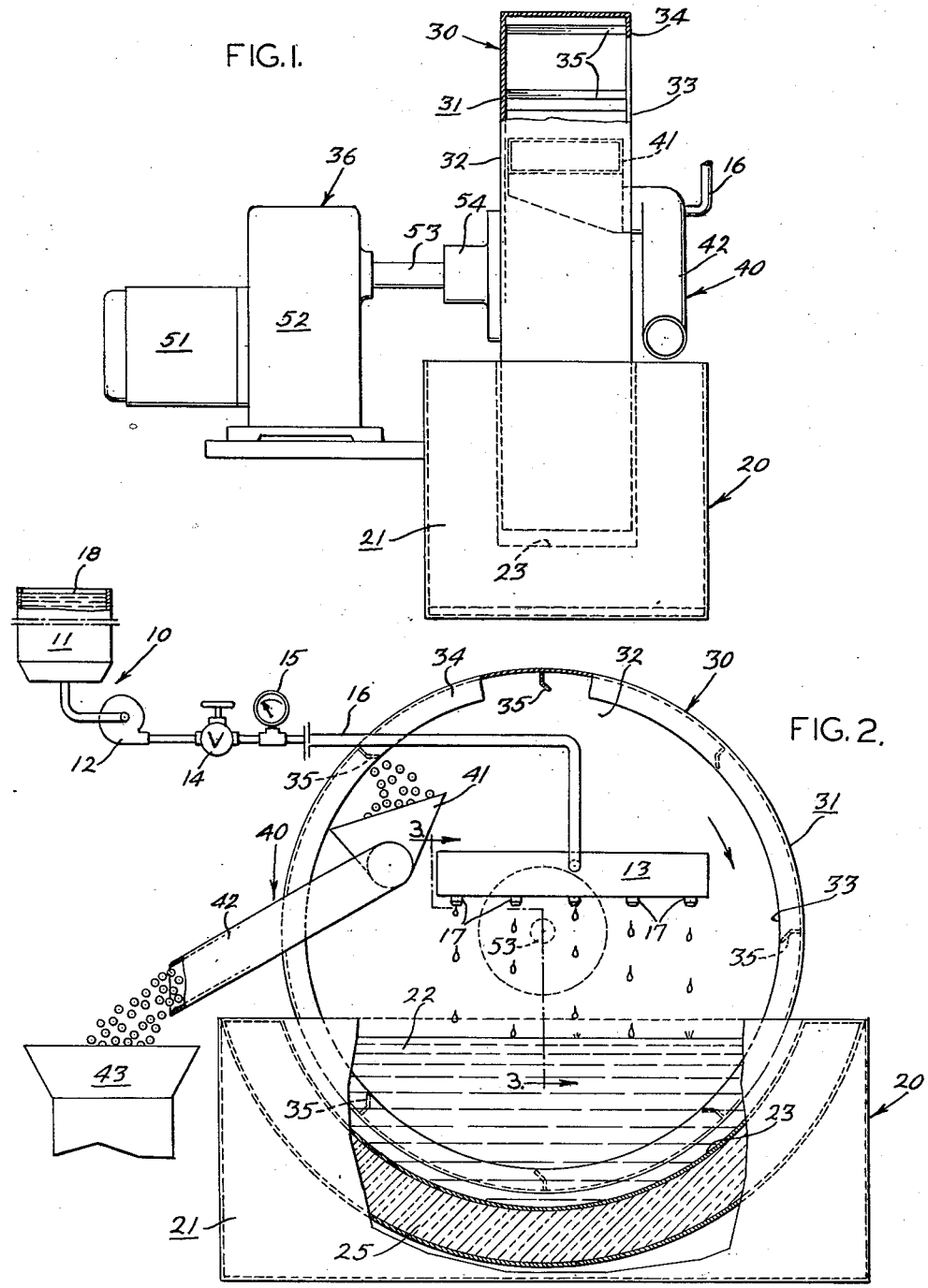

United States Patent Office 3,162,019
Patented Dec. 22, 1964

3,162,019
METHOD AND APPARATUS FOR FREEZING LIQUIDS TO BE USED IN A FREEZE-DRYING PROCESS
William L. Porter and William L. Root III, Bethlehem, Pa., assignors to The Bethlehem Corporation, Bethlehem, Pa., a corporation of Pennsylvania
Filed Nov. 16, 1962, Ser. No. 238,155
16 Claims. (Cl. 62—67)

The present invention relates to a method and apparatus for freezing materials, and more particularly to a method and apparatus adapted for very rapid freezing of liquids for subsequent treatment and removal of the volatile components, such as water, by the well-known vacuum sublimation principle.

A number of high quality food products have been produced by the freeze dry (vacuum sublimation) process. However, several problems have been encountered in the use of this process.

One of the most serious problems has been to freeze the liquid material in a form which lends itself to a uniform, economical drying system.

In the processing of blood plasma and pharmaceutical materials, the original fluid is often frozen in the bottle which is to serve as the final container for the product. The material is then dried in the bottle by transferring heat by conduction through the frozen material to the drying surface. This places a limitation on the quantity of heat supplied to the outside surface of the container, for it may not be any faster than the maximum heat transfer rate thru the frozen portion of the product. If an excess quantity of heat is supplied, water will be vaporized in areas where the vapor cannot readily escape. This causes a rise in pressure in these localized areas which results in thawing of the product. Therefore, drying by this method is very slow and unsuitable for large scale production.

Another method of freezing is to freeze the product in the drying pans. One of the primary problems with this method is obtaining uniform loading of the tray. If the frozen slab is not of uniform thickness, a problem is encountered in obtaining uniform drying of the product. In many instances the time allotted for the drying cycle must be extended to insure that no wet spots exist in the final dried slab. This method also has the same disadvantage as mentioned above when freezing and drying the product in the container. That is in drying there is no way for vapor to escape from the bottom of the tray before the drying boundry reaches the bottom. Therefore the quantity of heat and the rate at which it may be introduced through the bottom of the tray is limited. Thus in a commercial dryer the heating elements must be kept at a relatively low temperature.

Several attempts have been made to overcome these difficulties by freezing the slab in a separate mold and drying it on a perforated tray or screen. However, this requires a great deal of handling and at the risk of some thawing of the product when it is removed from the mold. In many cases, the slab must be returned to the freezer, after it is removed from the mold, to refreeze the surface. The extensive handling required makes this an expensive freezing method.

It is also desirable to eliminate the use of a self-type dryer which requires trays, by insuring that, after drying, the final product is in the form of a powder. Thus it is possible to dry the frozen material in a batch or a continuous agitated bed dryer. A horizontal pan or rotary dryer as well as a dryer with a moving belt for continuous processing may also be used. In using these types of dryers, it is desirable to provide the frozen material in the form of small, reasonably uniform pellets. These pellets should be small enough to be handled easily in conveying equipment and in the dryer, but they should not be so small that there will be excessive amounts of dust in the dryer or in the final product.

Pellets have been formed in small molds by, for example, the method illustrated in the Colton Patent No. 2,751,687. However, when using this method, the frozen material must be mechanically removed from the molds, and in practice, it is often difficult to remove frozen material from a mold without partially thawing it.

Another method of forming pellets has been attempted wherein the liquid to be frozen is forced through atomizing nozzles into a cold chamber wherein very fine particles, which are on the order of 0.5 to 500 microns in size, are instantly frozen. Such an apparatus is illustrated in the Barlow Patent No. 2,024,117. The particles produced by this method are so small that there may be dust losses in the drying operation and the final product may be very difficult to handle in packaging.

With the foregoing in mind, it is an object of this invention to provide a novel method and apparatus for freezing liquid materials very rapidly and efficiently for subsequent use in vacuum sublimation drying process which at the same time minimizes energy losses.

Another object of the present invention is to provide a novel method and apparatus for forming frozen particles of a discrete size which may more easily be handled in the subsequent drying stage.

A still further object of the present invention is to provide a novel combination of particle freezing means with means for removing the discrete particles for subsequent drying in a vacuum sublimation-type apparatus.

Another object of the present invention is to provide an apparatus which allows a small portion of the material to be frozen to come into direct contact with a liquid heat exchange medium which is kept at such a low temperature that the freezing process is instantaneous thereby preventing the formation of large water crystals within the material which would rupture frozen material particles.

Another object of the present invention is to provide an apparatus which is readily susceptible to operation in tandem.

Other objects and a fuller understanding of the invention may be had by referring to the following description and claims taken in conjunction with the accompanying drawings in which:

FIG. 1 is a profile view of apparatus made in accordance with the present invention with a portion of the apparatus broken away;

FIG. 2 is a side view of the apparatus illustrating the operation;

FIG. 3 is a profile section view taken along line 3—3 of FIG. 2;

FIG. 4 is a profile view of an embodiment of the invention utilizing two devices in tandem; and FIG. 5 is a schematic drawing of apparatus in accordance with the invention having a simple means for recovering gases evolved in the freezing process.

Referring now to the drawings, the embodiment of the present invention illustrated in FIGS. 1 to 3, and particularly FIG. 2, comprises a material supply and feed means 10 operable to supply small portions of the material, in the present instance liquid, in the form of droplets, a cooperating liquid pelletizer and freezing means 20 to form frozen discrete sized particles or pellets from the portions, and pellet removal means 30 for picking up the frozen pellets and unloading them into a conveyor means 40 for transportation to vacuum sublimation dryers or other treatment apparatus.

FIG. 2 best illustrates the material supply and feed means 10 of the present invention, in which liquid extract is supplied to the freezing means 20 to be frozen for subsequent treatment in vacuum sublimation dryers. A material feed tank 11 contains a supply of a liquid 18, such as coffee extract and is connected to a nozzle block and header 13 from which the liquid may feed into the freezer 20, for example by a length of sterile pipe to the suction side of a liquid feed pump 12. Because the method of forming frozen particles of discrete sizes utilized in the present invention does not require a high pressure feed of the liquid 18, the liquid feed pump is no larger than that necessary to supply a uniform quantity of the liquid 18 to the nozzle block and header 13. Other means may be employed to provide the necessary pressure differential with respect to the atmosphere, required to form a uniform flow of discrete sized droplets from the nozzle block and header. This differential varies with the density of the liquid extract and the desired droplet diameter, for example with less dense liquids pressures bordering on gravitational flow have been found sufficient to give a uniform feed rate, and with more dense liquids, pressures have been increased to approximately 0.8 of a pound per square inch to provide uniform flow.

To properly meter a low pressure flow to the nozzle block and header 13, a flow valve 14 and a pressure gauge 15 are placed intermediate the nozzle block and header 13 and the liquid feed pump 12. Connecting the pressure gauge to the nozzle block and header 13 is an insulated nozzle feed line 16. Extending vertically down from the nozzle and header block 13 are a series of nozzles 17 which are disposed across the bottom of the nozzle block 13. In order that the size of the droplet being fed into the low temperature liquid bath 22 may be more easily controlled, each nozzle is individually removable so that different internal diameter nozzles may be inserted. However, a typical nozzle diameter of approximately 0.8 of a millimeter (1/32 of an inch) has been found to give a flow rate upward of 40 milliliters per minute per nozzle at pressures not in excess of those previously mentioned.

Beneath the nozzle block and header 13 is located the pelletizer and freezing means 20 which freezes the small droplets into pellets. The liquid pelletizer and freezing means 20 comprises a suitably insulated tank 21 filled with a very low temperature liquid 22 into which are fed droplets of the liquid to be pelletized. The tank 21, of the liquid pelletizer and freezing means 20, is rectangular in external configuration, as illustrated in FIG. 2. The tank 21 consists of an inner arcuate bottom 23 to conserve the amount of low temperature liquid to be placed in the tank for the freezing process. The bottom 23 and sides are provided with suitable insulation 25 such as styrafoam.

As the liquid 18 flows through the nozzle and header block 13 and finally through the nozzle 17, small droplets of the liquid are formed. For ease of handling in subsequent removal from the pelletizer and freezing means 20 and for ease in transportation to vacuum sublimation dryers, while also maintaining a high surface area to volume ratio, the size of frozen droplet, pellet, or discrete particle formed should be approximately one millimeter in diameter. When the tiny droplets impinge at a low velocity upon the surface of the low temperature liquid 22, heat flows from the droplet to the liquid thus quickly reducing the temperature of the droplet to that of the low temperature liquid 22 thereby freezing the droplet into a discrete particle or pellet.

Presently, because of its immiscibility with other liquids and because it does not contaminate food stuffs, liquid nitrogen has been primarily utilized as the low temperature liquid 22 however, other suitable low temperature liquids, for example nitrous oxide, which possess the same qualities as nitrogen may be utilized. Further, because liquid nitrogen and nitrous oxide are relatively inexpensive to manufacture and may be easily conserved and reused, they are excellent low temperature liquids for use in the present invention. As the boiling points of liquid nitrogen and nitrous oxide at atmospheric pressure are well below the freezing point of the material supplied, approximately minus 195 and minus 86 degrees centigrade respectively, and since the diameter of the droplet is so small, the material portion freezes very quickly and the frozen particle attains the temperature of the liquid nitrogen in a very short time; furthermore since the specific gravity of nitrogen and nitrous oxide are less than the specific gravity of the material, the frozen material gravitates towards the bottom of the tank 21 through the low temperature liquid.

It has been discovered that the material portions have a short residence or flotation time on the surface of the liquid bath 22. This is accomplished when the liquid, in absorbing the heat from the droplet, boils, giving off gas which envelops the small droplet keeping it on the surface of the liquid. After the droplet freezes to form a pellet or discrete particle, the temperature of the pellet reaches the temperature of the liquid, the gas evolution which envelops the small droplet or pellet and causes it to remain on the surface of the liquid 22, stops, and the pellet falls through the liquid towards the inner bottom 23 of the tank 21. Since the boiling point of the liquid 22 is less than the freezing point of the material, it is insured that the material is frozen and is at the temperature of the bath before it falls. Furthermore, the relationship of the specific gravity of the liquid 22 and the frozen material is such that the evolved gas enveloping the frozen particle provides sufficient buoyancy to insure flotation of the particle during freezing, and that the particle falls through the liquid 22 upon arrest of gas evolution. Further, because the freezing of the droplets is almost instantaneous, the formation of rupture causing large water crystals within the frozen particle is prevented.

In order to intercept the frozen particle or pellet as it falls through the liquid 22 towards the inner bottom 23 of the tank 21, and to provide means to transport the frozen pellets out of the low temperature liquid 22 for subsequent treatment, pellet removal means 30 is provided. To that end a rotatable drum 31 surrounds the nozzle block and header 13 and is partially submerged in the liquid 22. As is illustrated in FIG. 1, a drive means 36 is centrally and axially connected to a side wall 32 of the drum 31 and acts both as a cantilever support means for the drum and to provide the rotational movement for the drum 31.

In the present embodiment of the invention and again referring to FIG. 1 particularly, the left hand vertical end of the drum 31 is closed by the end wall 32 while the right hand vertical end 33 is open. At the open end 33 a small radial flange 34 projects inward towards the rotational axis of the drum to prevent pellets from falling out of the drum.

As previously explained, the pellets whose specific gravity is greater than the low temperature liquid 22, falls down into the inner periphery of the rotating drum 31. To discharge the frozen pellets from the low temperature liquid 22 with the rotation of the drum 31, lift means in the form of axial lifters 35 are provided on the inner periphery of the drum as is illustrated in FIG. 2, the lifters 35 are placed inside the drum along the inner periphery and run parallel to the axis of the drum in equal-spaced relationship. In the present embodiment the lifters 35 are angled vanes such that the pellets falling down into the inner periphery of the rotating drum 31 are caught and thereby travel with the rotation out of the liquid. As is indicated in FIG. 2, the pellets remain on the lift means 35 until the height is reached at which they are no longer supported on the inner periphery of the drum 31 and the lift means 35, at which time they fall by gravity into a hopper 41 and a chute 42 of the conveyor means 40. The chute 42 is suspended at an angle sufficient to allow the pellets to roll through the chute into pellet transporting means 43.

The drive means 36 from which is suspended the rotatable drum 31, consists of a motor 51 which is directly connected through a reduction gear unit 52 to a shaft 53. The shaft 53 is attached to the vertical end wall 32 of the rotatable drum 31 by means of a flange coupling 54. To reduce the bending movement on the gear reduction unit 52 and the shaft 53, the gear reduction housing is placed close to the longitudinal side of the tank 21.

To prevent excessive heat entry into the tank 21 by convection, a suitably insulated cover 60 (see FIG. 5) is provided over the drum 31 and tank. Also, sufficient apertures are provided in the cover to allow entry of the nozzle feed line 16 and the shaft 53, and egress of the chute 42, and the escaping gases.

As previously explained, the tiny droplets hitting the surface of the low temperature liquid 22 cause gas evolution. The gas evolved as the droplet gives up its heat rises into the interior of the cover 60, and unless suitably discharged will apply excessive pressure both to the surface of the low temperature liquid and the inner surface of the cover 60. Therefore, suitable means is provided for removal of the gas and at the same time provision is made to minimize the loss of the heat-capturing capacity of the cold gases.

The rate of gas evolution will depend primarily on two factors: (1) the heat content, heat transfer co-efficient and rate of flow of the liquid flowing through the nozzle 17, and (2) the type of low temperature liquid 22 which is used in the liquid pelletizer and freezing means 20. As has been explained liquid nitrogen or nitrous oxide is used as the primary low temperature liquid 22 in the present embodiment of the invention, although nitrous oxide, as later explained, has definite advantages and is preferred for use in a recompression-type system.

Therefore several methods of gas removal and recovery may be provided. One simple method is illustrated in FIG. 5, wherein a compressor 61, the suction of which is connected to the top of the cover 60, removes and compresses into higher pressures the escaping gas. The gas is then forced through a condenser 62 wherein a quantity of heat is removed from the gas. Then, just as in the standard refrigeration system, the gas is passed through an expansion valve 63 at which time it reforms into a low temperature liquid. A small pump 65 at the bottom of the liquid storage tank 66 serves to feed the liquid nitrogen into the bottom of the tank 21 through a metering globe valve. This is just one example of means for removing and conserving the heat capturing capacity of the gas so evolved. If a recompression-type system as described above is to be used, the preferable low temperature liquid would be nitrous oxide as opposed to nitrogen because of the relatively higher boiling temperature of nitrous oxide.

Of course an arrangement could be utilized whereby the escaping gas is passed through a counter-flow heat exchanger and then exhausted to the atmosphere. In this case, it is preferred to employ the liquid 18 in the material supply and feed means 10 as the counter-flow heat exchange liquid, thus cooling the liquid 18 prior to its passing through the nozzle and header block 13. Since for example, liquid nitrogen may be processed from the air, exhausting the nitrogen gas to the atmosphere after passing through the counter-flow heat exchanger would not be considered on overt waste since great quantities of the liquid 18 could be pre-cooled prior to entry into the nozzle and header block 13.

For example, as shown in FIG. 4, the existing flanged coupling 54 may be used to connect an extension shaft 53a through the vertical side 32 of the existing rotatable drum 31 and through another rotatable drum 31a and then into a journal bearing support 70. This allows two units to be placed in tandem, and if the chute 42 is connected to a similar chute 42a in the second unit, a considerable increase in frozen pellet output is realized. Such an arrangement is illustrated in FIG. 4. Of course any number of units could be placed in series with one unit, the only restriction being that of space in which to place such units, and the size and horsepower of the drive means 36.

Thus the present invention provides a method and apparatus for freezing liquid materials rapidly and efficiently which keeps losses to a minimum while providing frozen pellets of a uniform discrete size which are more easily handled in subsequent vacuum sublimation drying stages. The pellet freezing apparatus is particularly adapted for use with a novel rotating drum, for efficiently and effectively carrying such pellets away.

Although the invention has been described with a certain degree of particularity it is understood that the present disclosure has been made only by way of example and numerous changes in the details of construction and the combination and arrangement of parts or the mode of operation may be made without departing from the spirit and scope of the invention as hereinafter claimed.

We claim.

1. A method of freezing material which comprises the steps of providing a low temperature liquid bath having a boiling point below the freezing point of the material to be frozen, feeding at a low impingement velocity small portions of the material to be frozen onto the surface of said bath, and suspending said portions in proximity to the surface of the bath by utilizing the heat in said portions to boil the liquid and evolve a gas therefrom until said portions are frozen into discrete particles having a low temperature approximately equal to said liquid bath, the specific gravity of said material and said liquid being such that said particles thereafter fall to the bottom of said bath.

2. A method of freezing material according to claim 1 wherein said material is normally of liquid form and wherein said feeding step consists in feeding at low pressures the liquid to be frozen in the form of droplets of discrete size.

3. A method of freezing material according to claim 1 wherein said material is normally of liquid form and wherein said feeding step consists in forming discrete sized droplets of the liquid to be frozen above the surface of said bath, and causing said droplets to drop onto the surface of said bath.

4. A method of freezing materials according to claim 1 wherein said low temperature liquid of said bath is immiscible with the material to be frozen.

5. A method of freezing materials according to claim 1 including the step of discharging said particles from said low temperature liquid bath as they fall to the bottom of said bath.

6. A method of freezing material according to claim 5 including the steps of capturing the gas evolved in the freezing process, returning said evolved gas to a low temperature liquid state, and recirculating said liquid back into said low temperature liquid bath.

7. A method of freezing liquid food stuff which comprises the steps of providing a low temperature liquid bath having a boiling point below the freezing point of the liquid food stuff to be frozen, feeding at a low impingement velocity discrete size droplets of the liquid food stuff to be frozen onto the surface of said bath, suspending said droplets in proximity to the surface of said bath by utilizing the heat in said droplets to boil the liquid and evolve a gas therefrom until said droplets are frozen into discrete particles having a low temperature approximately equal to said liquid bath, the specific gravity of said discrete sized droplets and said liquid being such that said particles thereafter fall to the bottom of said bath, and discharging said discrete sized particles from said low temperature bath as they fall to the bottom of said bath.

8. A freezing device for materials comprising in combination a material supply means, means for containing a bath of a low temperature liquid heat exchange medium having a specific gravity less than the material supplied, a material-injecting means including a plurality of nozzles constructed to dispense at low pressures discrete portions of material of a substantially uniform size from said material supply means, said plurality of nozzles being suspended above the surface of the low temperature bath to drop said discrete portions onto the surface of said low temperature bath so as to freeze the material into particles, a frozen particle removal means having a support means positioned adjacent said means for containing a bath and suspending said particle removal means in said low temperature liquid bath so as to remove said particles only after they substantially reach the temperature of said low temperature bath.

9. A freezing device for material in accordance with claim 8 wherein said means for containing a bath contains a low temperature heat exchange medium which is immiscible with the material to be frozen.

10. A freezing device for material according to claim 9 wherein said material consists of a liquid and said frozen particle removal means includes a rotating drum, said rotating drum partially immersed in said low temperature liquid heat exchange medium and surrounding said nozzles, at least one lift means attached to said rotating drum and positioned to remove only said particles which have reached the temperature of said low temperature liquid bath and have gravitated below the surface of said bath.

11. A freezing device for liquid comprising in combination a liquid supply means having an outlet in the form of a series of nozzles for dispensing droplets of the liquid to be frozen, a low temperature liquid freezing means comprising a tank for containing a bath of a low temperature heat exchange liquid immiscible with said liquid droplets, said nozzles being suspended over said low temperature bath so that the droplets dispensed from said nozzles gravitationally fall onto the surface of said low temperature liquid bath to be thereafter frozen into discrete particles, a particle removal means having a cantilever-supported rotatable drum partially immersed in said low temperature heat exchange liquid and surounding said nozzles and at least one lift means on the inner periphery of said rotating drum to remove said discrete particles.

12. A freezing device for liquids in accordance with claim 11 including a conveyor means above said low temperature heat exchange liquid and cooperating with said rotatable drum so as to receive the discrete particles from the inner periphery of said rotating drum and remove them for subsequent treatment.

13. A freezing device for liquids in accordance with claim 12 wherein said conveyor means includes a hopper into which the discrete particles fall after said rotating drum reaches a predetermined point, a chute operating in conjunction with said hopper operable to transport the discrete particles outside of said device for subsequent treatment.

14. A freezing device for liquids in accordance with claim 11 including a cover over said tank to minimize heat entry into said tank.

15. A freezing device for liquids in accordance with claim 14 wherein heat exchange liquid has a boiling point below the freezing point of said liquid droplets so as to evolve a gas when freezing said droplets, said cover being gas-tight to contain the evolved gas and including means for removal of gas evolved when said liquid droplets are frozen into discrete particles, means for reliquefying the evolved gas, and means for recirculating the liquefied gas back into said bath of low temperature heat exchange liquid.

16. A freezing device for materials comprising in combination a material supply means having at least two outlets, each of said outlets in the form of a series of nozzles for dispensing small portions of the material to be frozen, a low temperature liquid freezing means comprising a tank for containing a bath of a low temperature heat exchange liquid immiscible with said material, said nozzles being suspended over said low temperature bath so that said small portions of material dispensed from said nozzles gravitationally fall onto the surface of said low temperature liquid bath and are thereafter frozen into discrete particles, a particle removal means having for each series of nozzles at least one rotatable drum partially immersed in said low temperature heat exchange liquid and surrounding said nozzles, at least one lift means on the inner periphery of each rotating drum to remove said discrete particles from said low temperature bath, a drive means inter-connecting all of said drums to rotate said drums, at least two conveyor means, one cooperating with each of said rotating drums, said conveyor means being connected together so that as said lift means on the inner periphery of each rotating drum reaches a predetermined position said discrete particles fall out of each drum onto their respective conveyor means and are thereby removed for subsequent treatment.

References Cited in the file of this patent

UNITED STATES PATENTS

| | | |
|---|---|---|
| 2,482,747 | Davis | Sept. 27, 1949 |
| 2,875,588 | Berger | Mar. 3, 1959 |
| 3,011,637 | Felsch | Dec. 5, 1961 |
| 3,023,588 | Morrison | Mar. 6, 1962 |